(12) United States Patent
Lin

(10) Patent No.: US 7,193,624 B2
(45) Date of Patent: Mar. 20, 2007

(54) DISPLAY APPARATUS WITH POWER SAVING CAPABILITY

(75) Inventor: Tony Lin, Taipei County (TW)

(73) Assignee: Amtran Technology Co., Ltd., Chung Ho City (TW)

( * ) Notice: Subject to any disclaimer, the term of this patent is extended or adjusted under 35 U.S.C. 154(b) by 609 days.

(21) Appl. No.: 10/720,432

(22) Filed: Nov. 24, 2003

(65) Prior Publication Data

US 2005/0110787 A1    May 26, 2005

(51) Int. Cl.
*G09G 5/00* (2006.01)
*G06F 1/26* (2006.01)

(52) U.S. Cl. ............................... 345/211; 713/310
(58) Field of Classification Search ........... 345/211, 345/212, 204; 713/300, 310, 320; 348/730
See application file for complete search history.

(56) References Cited

U.S. PATENT DOCUMENTS

| | | | |
|---|---|---|---|
| 3,916,288 A * | 10/1975 | Hicks et al. | 361/94 |
| 5,550,557 A * | 8/1996 | Kapoor et al. | 345/76 |
| 6,549,197 B1 * | 4/2003 | Kim | 345/211 |
| 7,050,049 B2 * | 5/2006 | Byun | 345/211 |
| 7,106,319 B2 * | 9/2006 | Ishiyama | 345/211 |

* cited by examiner

Primary Examiner—Richard Hjerpe
Assistant Examiner—Kevin M. Nguyen
(74) Attorney, Agent, or Firm—Frommer Lawrence & Haug LLP; Ronald R. Santucci

(57) ABSTRACT

A power control unit of a display apparatus includes an AC-to-DC converter for receiving an external AC power. A regulator receives a DC output from the converter, and is operable in one of an enabled state of outputting a target DC power when receiving a first level signal, and a disabled state of not outputting the target DC power when receiving a second level signal. An electronic switch is operable for switching from an OFF-mode, where a processor permits a delay circuit to output the second level signal to the regulator, to an ON-mode, where the electronic switch initially enables the delay circuit to output the first level signal to the regulator such that the processor receives the target DC power from the regulator and where the electronic switch outputs a trigger signal to the processor so as to enable the processor to latch the first level signal and to provide the target DC power to a display module.

8 Claims, 4 Drawing Sheets

DISPLAY APPARATUS WITH POWER SAVING CAPABILITY

BACKGROUND OF THE INVENTION

1. Field of the Invention

The invention relates to a display apparatus, more particularly to a display apparatus with a power saving capability.

2. Description of the Related Art

FIG. 1 illustrates a conventional display apparatus that includes an alternating current-to-direct current converter 11 for converting an external alternating current power into a direct current voltage of about 12 volts, a regulator 12 connected electrically to the converter 11 for converting the direct current voltage into a target direct current voltage of about 5 volts, and a processor 13 connected electrically to the regulator 12 for receiving the target direct current voltage so as to provide the target direct current voltage to a display module 14. A mechanical switch 15 interconnects electrically the converter 11 and the regulator 12 and is operable so as to control power supply. However, contacts in the mechanical switch 15 are susceptible to oxidation, which can result in switch failure after a period of use.

In order to solve the above problem, an electronic switch 16, which is connected electrically to the processor 13, is used to replace the mechanical switch 15 in another conventional display apparatus shown in FIG. 2. The electronic switch 16 is operable so as to switch from an OFF-mode to an ON-mode. When the processor 13 detects that the electronic switch 16 is in the OFF-mode, the processor 13 does not provide the target direct current power to the display module 14. On the other hand, when the processor 13 detects that the electronic switch 16 is in the ON-mode, the processor 13 provides the target direct current power to the display module 14. It is noted that, even though the electronic switch 16 is in the OFF-mode (i.e., the display apparatus is turned off), the processor 13 still receives the target direct current power, thereby resulting in additional power consumption. Furthermore, when power interruption occurs while the display apparatus is turned on, the electronic switch 16 needs to be pushed again to reset the same to initial ON-mode when power is restored.

SUMMARY OF THE INVENTION

Therefore, the object of the present invention is to provide a display apparatus with a power saving capability that utilizes a delay circuit so as to terminate power supply to a processor when an electronic switch is in an OFF-mode.

According to the present invention, a display apparatus comprises:

a display module; and a power control unit coupled electrically to the display module, the power control unit including an alternating current-to-direct current converter adapted to be connected electrically to an external power source so as to receive an alternating current power therefrom, the converter providing a direct current output, a regulator connected electrically to the alternating current-to-direct current converter and having a power input end for receiving the direct current output from the alternating current-to-direct current converter, a control input end, and an output end, the regulator being operable in one of an enabled state, where the regulator outputs a target direct current power at the output end when the control input end receives a first level signal, and a disabled state, where the regulator does not output the target direct current power at the output end when the control input end receives a second level signal, a delay circuit connected electrically to the alternating current-to-direct current converter and the control input end of the regulator, the delay circuit being capable of outputting one of the first and second level signals to the regulator, a processor connected electrically to the output end of the regulator, the delay circuit and the display module, and an electronic switch connected electrically to the delay circuit and the processor, the electronic switch being operable for switching from an OFF-mode, where the processor permits the delay circuit to output the second level signal to the regulator such that the regulator is operated in the disabled state, to an ON-mode, where the electronic switch initially enables the delay circuit to output the first level signal to the control input end of the regulator such that the processor receives the target direct current power from the regulator and where the electronic switch outputs a trigger signal to the processor so as to enable the processor to latch the first level signal outputted by the delay circuit and to provide the target direct current power to the display module.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
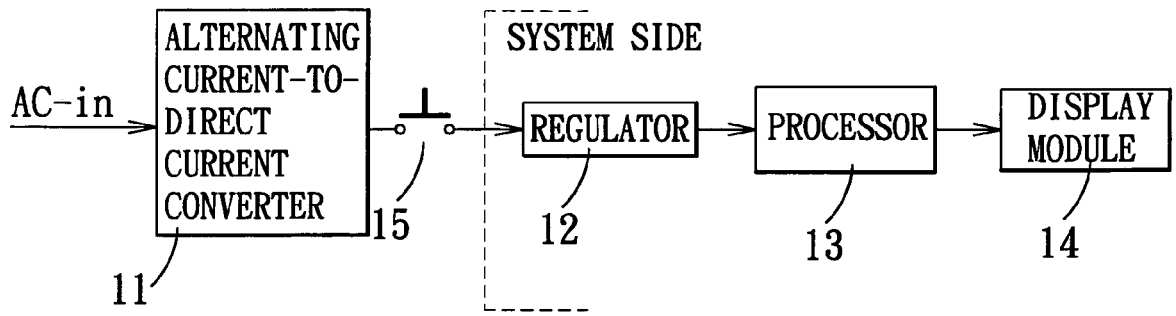
FIG. 1 is a schematic circuit block diagram illustrating a conventional display apparatus.
Figure 2:
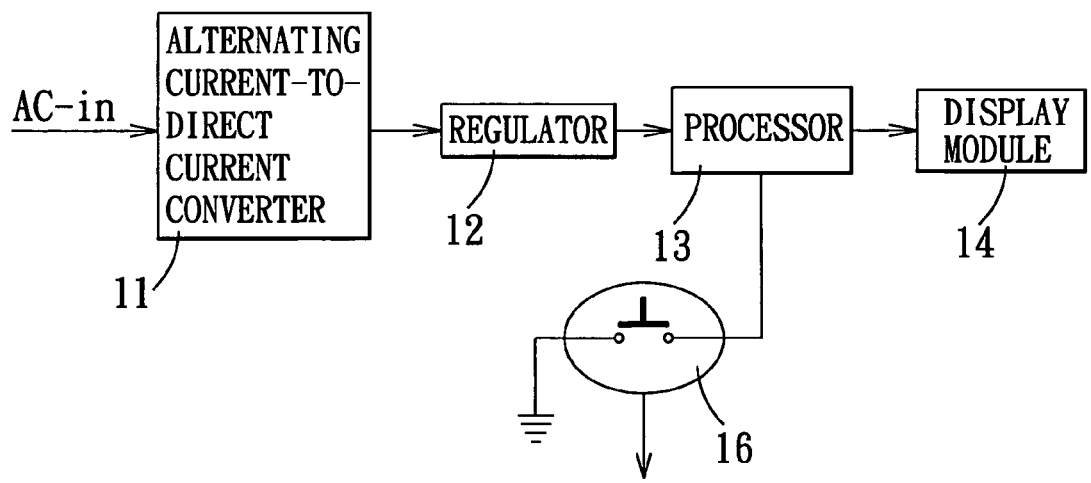
FIG. 2 is a schematic circuit block diagram illustrating another conventional display apparatus.

Before the present invention is described in greater detail, it should be noted that like elements are denoted by the same reference numerals throughout the disclosure.

Figure 3:
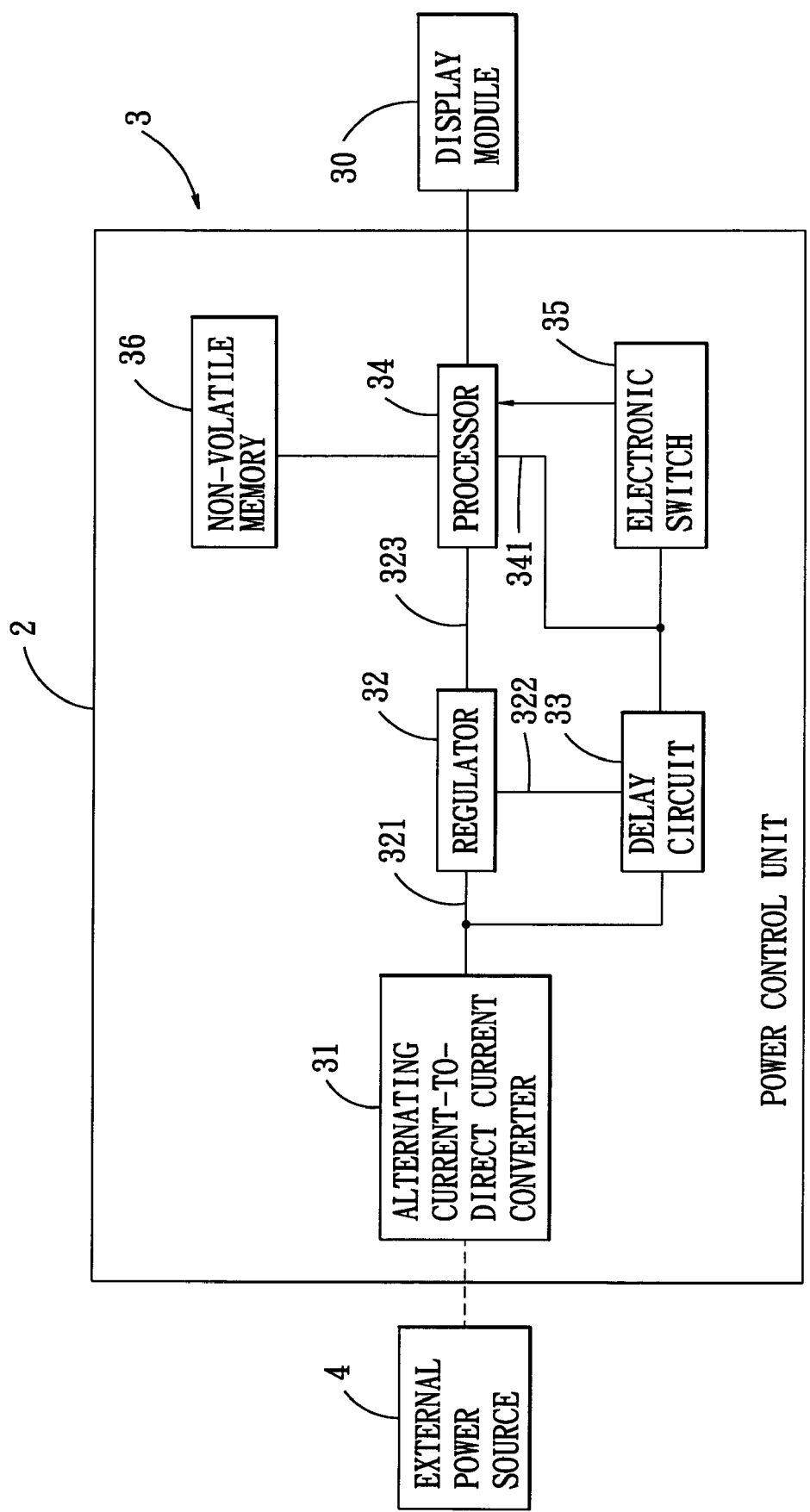
FIG. 3 is a schematic circuit block diagram illustrating the first preferred embodiment of a display apparatus according to the present invention.
Figure 4:
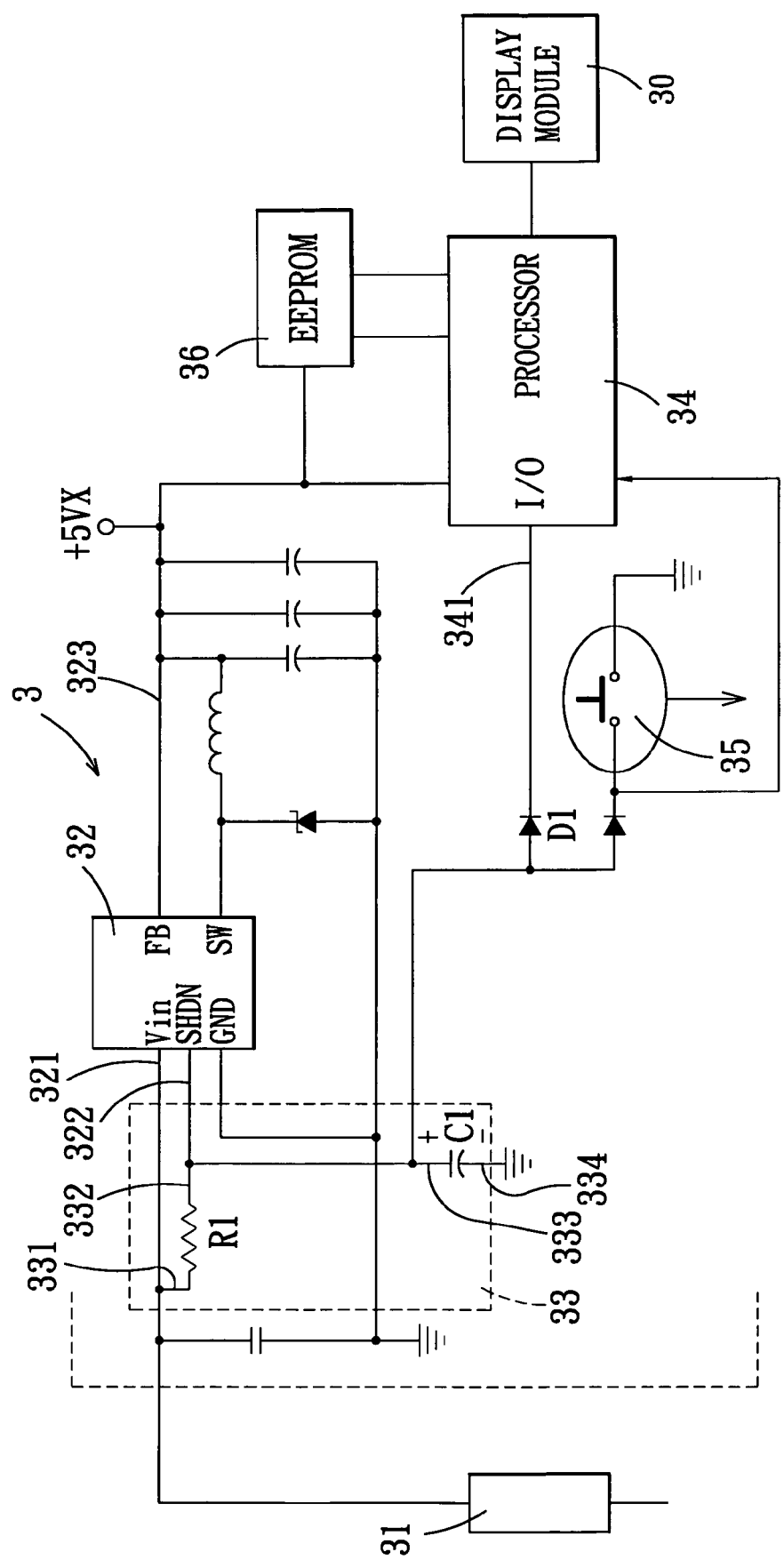
FIG. 4 is a schematic electrical circuit diagram illustrating the first preferred embodiment.

Referring to FIGS. 3 and 4, the first preferred embodiment of a display apparatus 3 according to the present invention is shown to include a display module 30 and a power control unit 2.

The power control unit 2 is coupled electrically to the display module 30, and includes an alternating current-to-direct current converter 31, a regulator 32, a delay circuit 33, a processor 34, and an electronic switch 35.

The alternating current-to-direct current converter 31, such as an adapter, is adapted to be connected electrically to an external power source 4 so as to receive an alternating current power therefrom, and provides a direct current output, such as 12 Volts.

The regulator 32 is connected electrically to the alternating current-to-direct current converter 31, and has a power input end 321 for receiving the direct current output from the alternating current-to-direct current converter 31, a control input end 322, and an output end 323. The regulator 32 is operable in one of an enabled state, where the regulator 32 outputs a target direct current output, which has a voltage amplitude less than that of the direct current output, such as 5 volts, at the output end 323 when the control input end 321 receives a first level signal, and a disabled state, where the regulator 32 does not output the target direct current power at the output end 323 when the control input end 322 receives a second level signal. In this embodiment, the first level signal is a low-level signal, whereas the second level signal is a high-level signal.

The delay circuit 33 is connected electrically to the alternating current-to-direct current converter 31 and the control input end 322 of the regulator 32. The delay circuit 33 is capable of outputting one of the first and second level signals to the regulator 32. In this embodiment, the delay circuit 33 includes a resistor (R1) having one end 331 connected electrically to the power input end 321 of the regulator 32, and the other end 332 connected electrically to the control input end 322 of the regulator 32, and a capacitor (C1) having a first terminal 333 connected electrically to the other end 332 of the resistor (R1) and the control input end 322 of the regulator 32, and a grounded second terminal 334, as best shown in FIG. 4.

The processor 34 is connected electrically to the output end 323 of the regulator 32, the delay circuit 33 and the display module 30. In this embodiment, the processor 34 includes an input/output port 341 connected electrically to the first terminal 333 of the capacitor (C1) of the delay circuit 33 via a diode (D1), as shown in FIG. 4.

The electronic switch 35 is connected electrically to the delay circuit 33 and the processor 34. The electronic switch 35 is operable for switching from an OFF-mode, where the processor 34 permits the delay circuit 33 to output the second level signal such that the regulator 32 is operated in the disabled state, to an ON-mode, where the electronic switch 35 initially enables the delay circuit 33 to output the first level signal to the control input end 322 of the regulator 32 such that the processor 34 receives the target direct current power from the regulator 32 and where the electronic switch 35 outputs a trigger signal to the processor 34 to latch the first level signal outputted by the delay circuit 33 and to provide the target direct current power to the display module 30.

The processor 34 defines a flag to indicate whether the electronic switch 35 is in the ON-mode or the OFF-mode. Furthermore, the display apparatus further includes a nonvolatile memory 36, such as an EEPROM, for storing the flag. As such, the processor 34 permits the delay circuit 33 to output the second level signal when the flag stored in the memory 36 indicates that the electronic switch 35 is in the OFF-mode, and to output the first level signal when the flag stored in the memory 36 indicates that the electronic switch 35 is in the ON-mode.

The power control procedure associated with the display apparatus 3 will be described in detail herein according to the above configuration.

When the alternating current-to-direct current converter 31 is initially connected electrically to the alternating current power 30 so as to receive the alternating current power therefrom, the direct current output from the alternating current-to-direct current converter 31 flows through the resistor (R1) of the delay circuit 33 and to the control input end 322 of the regulator 32 that is initially in a low level state. Since the capacitor (C1) has yet to be charged, the control input end 322 of the regulator 32 initially receives the first level signal (the low-level signal) such that the regulator 32 in the enabled state outputs the target direct current power to the processor 34. When the processor 34 receives the target direct current from the regulator 32, the processor 34 permits, at first, the delay circuit 33 to output the first level signal in order to ensure the output of the target direct current power to the processor 34 necessary for subsequent processing of the latter. At this time, the processor 34 reads the flag stored in the memory 36 and detects whether the previous mode of the electronic switch 35 is in the ON-mode or the OFF-mode according to the flag read thereby.

Specifically, if the flag read from the memory 36 indicates the previous mode of the electronic switch 35 to be the ON-mode (such as in the case that the alternating current power from the external power source 30 is unexpectedly interrupted), the processor 34 permits the delay circuit 33 to output the first level signal. On the other hand, if the flag read from the memory 36 indicates the previous mode of the electronic switch 35 to be the OFF-mode, the processor 34 unlatches the first level signal outputted by the delay circuit 33 through the input/output port 341. Since the capacitor (C1) is charged, the second level signal (a high-level signal) is outputted to the regulator 32. As such, the regulator 32 in the disabled state does not output the target direct current power, thereby reducing power consumption in the display apparatus 3 during a standby period.

To turn on the display apparatus 3, the electronic switch 35 is operated to the ON-mode. At this time, the electronic switch 35 enables the delay circuit 33 to output the first level signal (a low-level signal) to the control input end 322 of the regulator 32 such that the processor 34 receives the target direct current power from the regulator 32, and the electronic switch 35 outputs a trigger signal to the processor 34. In response to the trigger signal, the processor 34 latches the first level signal outputted by the delay circuit 33 through the input/output port 341, updates the flag in the memory 36 to reflect the ON-mode of the electronic switch 35, and provides the target direct current power to the display module 30.

To turn off the display apparatus 3, the electronic switch 35 is operated to the OFF-mode. In response to the electronic switch 35, the processor 34 unlatches the first level signal outputted by the delay circuit 33 through the input/output port 341, and updates the flag in the memory 36 to indicate the OFF-mode of the electronic switch 35. The second level signal is provided by the delay circuit 33 to the regulator 32, thereby disabling the latter.

Figure 5:
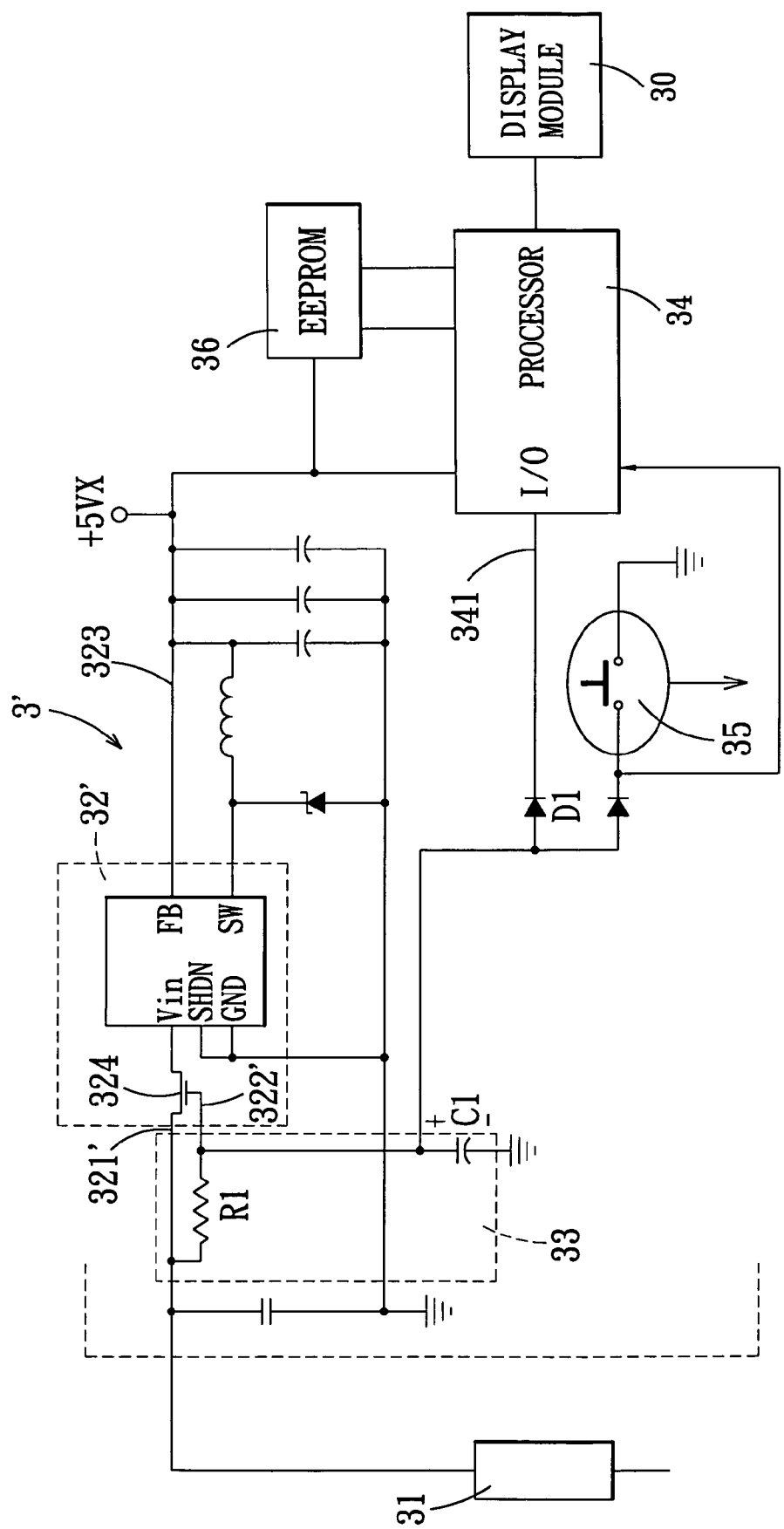
FIG. 5 is a schematic electrical circuit diagram illustrating the second preferred embodiment of a display apparatus according to the present invention.

FIG. 5 illustrates the second preferred embodiment of a display apparatus 3' according to this invention, which is a modification of the first preferred embodiment. Unlike the embodiment of FIG. 4, the regulator 32' includes a transistor 324 that has a source 321' serving as the power input end, and a gate 322' serving as the control input end. When the gate 322' receives the first level signal (low-level signal), the transistor 324 conducts such that the regulator 32' receives the direct current output from the alternating current-to-direct current converter 31 at the source 321' and outputs the target direct current power at the output end 323. When the gate 322' receives the second level signal (high-level signal), the transistor 324 is cut off such that the regulator 32' does not receive the direct current output from the alternating current-to-direct current converter 31.

The following are some of the advantages attributed to the display apparatus 3, 3' of the present invention:

1. When the display apparatus 3, 3' is turned off, the delay circuit 33, 33' outputs the second level signal as a result of the charged capacitor (C1) such that the processor 34 does not receive the target direct current power from the regulator 32, 32', thereby reducing power consumption in the display apparatus 3, 3'.

2. Due to the use of the flag, the processor 34 can control the operation of the delay circuit 33, 33' in accordance with the flag stored in the memory 36. As such, even though the alternating current power is restored after power interruption, the processor 34 can appropriately control the operation of the delay circuit 33, 33' to resume power supply to the display module 30.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A display apparatus comprising:
   a display module; and
   a power control unit coupled electrically to said display module, said power control unit including
   an alternating current-to-direct current converter adapted to be connected electrically to an external power source so as to receive an alternating current power therefrom, said converter providing a direct current output,
   a regulator connected electrically to said alternating current-to-direct current converter and having a power input end for receiving the direct current output from said alternating current-to-direct current converter, a control input end, and an output end, said regulator being operable in one of an enabled state, where said regulator outputs a target direct current power at said output end when said control input end receives a first level signal, and a disabled state, where said regulator does not output the target direct current power at said output end when said control input end receives a second level signal,
   a delay circuit connected electrically to said alternating current-to-direct current converter and said control input end of said regulator, said delay circuit being capable of outputting one of the first and second level signals to said regulator,
   a processor connected electrically to said output end of said regulator, said delay circuit and said display module, and
   an electronic switch connected electrically to said delay circuit and said processor, said electronic switch being operable for switching from an OFF-mode, where said processor permits said delay circuit to output the second level signal to said regulator such that said regulator is operated in the disabled state, to an ON-mode, where said electronic switch initially enables said delay circuit to output the first level signal to said control input end of said regulator such that said processor receives the target direct current power from said regulator and where said electronic switch outputs a trigger signal to said processor so as to enable said processor to latch the first level signal outputted by said delay circuit and to provide the target direct current power to said display module.

2. The display apparatus as claimed in claim 1, wherein the target direct current power has a voltage amplitude less than that of the direct current output.

3. The display apparatus as claimed in claim 1, wherein said regulator includes a transistor that has a source serving as said power input end, and a gate serving as said control input end.

4. The display apparatus as claimed in claim 1, wherein said processor defines a flag to indicate whether said electronic switch is in the ON-mode or the OFF-mode.

5. The display apparatus as claimed in claim 4, further comprising a non-volatile memory for storing the flag.

6. The display apparatus as claimed in claim 5, wherein said processor permits said delay circuit to output the second level signal when the flag stored in said memory indicates that said electronic switch is in the OFF-mode, and to output the first level signal when the flag stored in said memory indicates that said electronic switch is in the ON-mode.

7. The display apparatus as claimed in claim 1, wherein said processor includes an input/output port connected electrically to said delay circuit.

8. The display apparatus as claimed in claim 7, wherein said delay circuit includes a resistor having one end connected electrically to said power input end of said regulator, and the other end connected electrically to said control input end of said regulator, and a capacitor having a first terminal connected electrically to the other end of said resistor, said control input end of said regulator and said input/output port of said processor, and a grounded second terminal.

* * * * *